(12) United States Patent
Pautet et al.

(10) Patent No.: US 6,600,291 B2
(45) Date of Patent: Jul. 29, 2003

(54) PORTABLE APPARATUS USABLE WITH BOTH PRIMARY CELLS AND SECONDARY CELLS

(75) Inventors: Franck Pautet, Le Mans (FR); Fabrice Avoie, Vivoin (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/885,706

(22) Filed: Jun. 20, 2001

(65) Prior Publication Data

US 2002/0060550 A1 May 23, 2002

(30) Foreign Application Priority Data

Jun. 20, 2000 (FR) .............................. 00 07863

(51) Int. Cl.[7] .................................................. H02J 7/00
(52) U.S. Cl. ....................................................... 320/103
(58) Field of Search ................................. 320/103, 107; 439/52, 53, 97–100, 560, 516, 568; 429/96–100

(56) References Cited

U.S. PATENT DOCUMENTS

| 5,015,546 | A | 5/1991 | Dulaney et al. ............... 429/9 |
|---|---|---|---|
| 5,661,392 | A | 8/1997 | Imazeki ...................... 320/106 |
| 6,014,009 | A | 1/2000 | Wierzbicki et al. ......... 320/107 |
| 6,172,480 | B1 * | 1/2001 | Vandelac ..................... 320/125 |
| 6,285,159 | B1 * | 9/2001 | Ki et al. ..................... 320/112 |

FOREIGN PATENT DOCUMENTS

| EP | 493253 | * 7/1992 | |
| EP | 0858172 A1 | 8/1998 | ............ H04B/1/38 |
| WO | WO9745900 | 12/1997 | ........... H01R/23/72 |

* cited by examiner

Primary Examiner—Edward H. Tso
Assistant Examiner—Pia Tibbits
(74) Attorney, Agent, or Firm—Jack D. Slobod

(57) ABSTRACT

The power supply device may be used for portable apparatuses that can be powered either by primary cells or by a rechargeable battery, without using removable adapter pieces. It also allows adaptation to different types of chargers for rechargeable batteries.

It uses two series (6, 7) of battery contact pins (21, 22) for identifying the battery chargers, double pins (11, 12 and 13, 14) for connection to the primary cells (10), and composite pins (31, 32) used for the primary cells as well as for the rechargeable batteries (20). The strips of certain contact pins are lodged in notches so as to constitute error-eliminating means.

5 Claims, 4 Drawing Sheets

US 6,600,291 B2

PORTABLE APPARATUS USABLE WITH BOTH PRIMARY CELLS AND SECONDARY CELLS

BACKGROUND OF THE INVENTION

1. Field of the Invention

The invention relates to portable apparatuses operating by electric energy. Particularly, mobile telephones are concerned but also all remote control systems for apparatuses that can be remote-controlled, for example by a person carrying a corresponding remote control device.

2. Description of the Related Art

In portable apparatuses, such as mobile telephones, it is common practice to use a housing or a power block mounted in a removable or non-removable manner in the body of the portable apparatus. The user of the portable apparatus has to see to it that the power supply device of his apparatus is always operational so as to supply it with electricity.

There are different types of power supply devices notably using primary cells, i.e., cells which are non-rechargeable and discardable after use, and also secondary cells, i.e., cells which are rechargeable such as a rechargeable battery referred to as battery pack. Portable apparatus housings which are capable of accommodating either primary cells or secondary cells are thus known. In other words, the housing is formed to accommodate these two types of electric cells but the user himself must replace the cells of one type by those of another, notably replace used cells by new cells. On this occasion he may be liable to make a mistake when mounting the cells in the housing. It is therefore useful for him to have error-eliminating components so that he cannot perform the wrong mounting. It is to be noted that when a set of secondary cells such as a rechargeable battery is discharged, the user recharges them by a battery charger, which is generally delivered with the portable apparatus. When the power supply device no longer supplies electricity, several solutions are thus possible for the user, such as recharging the secondary cells, i.e., the rechargeable battery, when these are discharged, or using primary cells bought on the market, for example, when the user has forgotten the battery charger.

Such a device or power block is described in European patent application EP-0 858 172. The power block principally comprises a cavity in which the two types of cells can be placed. A first connector is intended to co-operate with a second connector incorporated with the rechargeable battery. However, a removable adapter piece is necessary to ensure the connection between the first collector and the primary cells when these are used and placed in the cavity. This necessitates the correct placement of this removable piece, which involves the manipulation of the latter and, consequently, the risk of losing or damaging it.

SUMMARY OF THE INVENTION

An essential first object of the invention is to remedy this drawback by providing a power supply device for a portable apparatus suitable for accommodating the two types of cells without necessitating the use or manipulation by the user of a removable adapter piece.

To this end, the principal object of the invention is to provide a power supply device for a portable apparatus, suitable for using different types of power supply and comprising a housing having a principal cavity which can accommodate two types of cells, i.e., either at least a primary cell having a given length, or a rechargeable battery, and in which two series of contact pins are present for contacting the cells or the rechargeable battery with circuits for using the portable apparatus, without using supplementary, removable, adapter elements.

In a principal embodiment of the invention, the majority of pins have a swan neck shape, thus allowing great flexibility without passing beyond the elastic limit of the material used.

However, to rigidify certain of these flexible contact pins, their extremity is preferably widened so that it can be fixed in the body for constituting prestressed contact pins.

First error-eliminating means are used for mounting the primary cells in the sense that a contact pin for a cell is placed on the bottom of a notch which is deeper than the contact pin itself, while the contact pin has a smaller width than the notch which in turn has a smaller width than the cell so as to allow the contact pin, which is present on a first extremity of the cell, to come into contact with the contact pin placed in the groove, but prevents the cell from being inserted by its other extremity.

In conformity therewith, second error-eliminating components are also used for mounting primary cells constituted by a wide, rigid contact pin placed between two first error-eliminating components and whose central non-conducting part is constituted by an abutment spaced apart from the edges of the notch of the contact pin of the corresponding cell which is smaller than the given length of the cells. In the latter case, the contact pin does not have a swan neck shape.

In a principal embodiment of the invention, a supplementary contact pin is used to identify the battery chargers, as well as an electronic circuit, allowing recognition of the battery chargers equipped with a component having a negative temperature coefficient (NTC) and connection of the rechargeable battery and the charge circuit situated on a printed circuit board of the portable apparatus intended to be connected to a charger.

A thermal switch is used in each rechargeable battery for protecting this rechargeable battery from excessive charging.

These and other aspects of the invention are apparent from and will be elucidated, by way of non-limitative example, with reference to the embodiment(s) described hereinafter.

DETAILED DESCRIPTION OF THE PRESENTLY PREFERRED EMBODIMENTS

Figure 1:
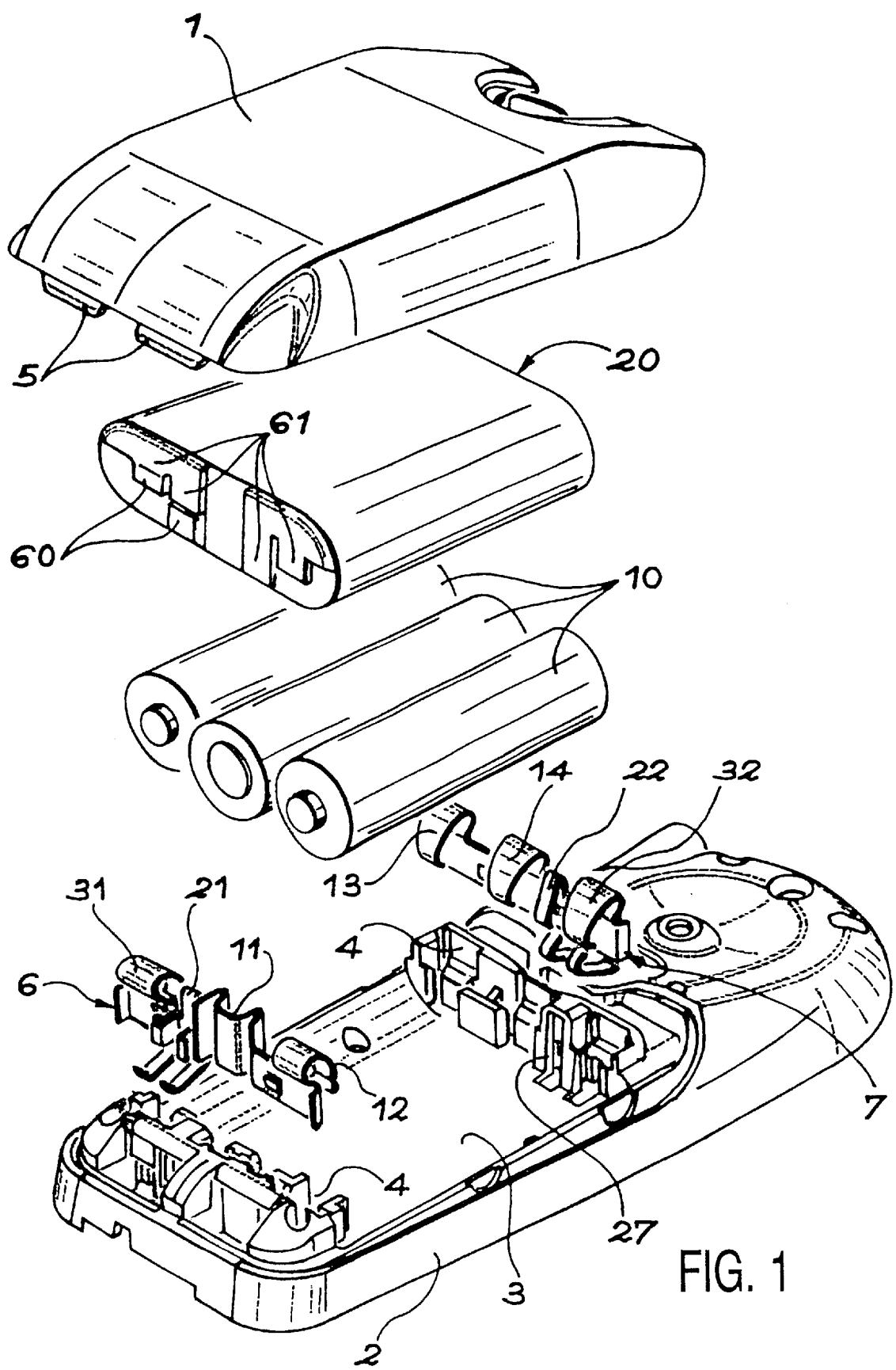
FIG. 1 is an exploded view of the power supply device according to the invention, installed in a mobile apparatus and accompanied by two types of cells.

With reference to FIG. 1, it is easy to take the type of material into account to which the invention relates. FIG. 1 shows a cover 1 before its fixation on a housing 2 of an apparatus by two lugs 5, after which either a set of three primary cells 10 or a rechargeable battery 20 is installed in a cavity 3 of the housing 2. The exploded view allows distinction of the principal elements of the mobile apparatus of the device according to the invention and the cells or battery used.

Two series of contact pins can be distinguished, one denoted 6 and referred to as "foot" series and 7, referred to as "head" series. Each of these series 6 and 7 is placed on either side of the cavity 3 in a set of notches 4 formed in the housing 2. The arrangement of each of these two series 6 and 7 and notably the shape of the different contact pins which they constitute, makes them suitable for accommodating either the set of three primary cells 10 of the standard type, notably the type "R6", or a rechargeable battery 20 whose shape must be compatible with the shape of the different contact pins and their positioning.

The shape of each pin is shown in one of the FIGS. 2 to 5.

Figure 2:
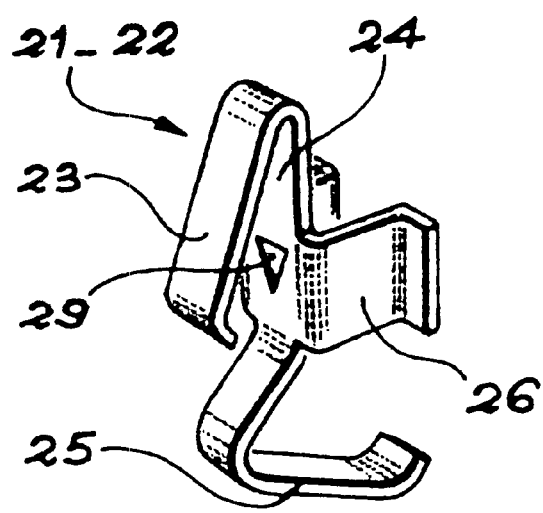
FIG. 2 shows the first type of contact pins referred to as battery pins, used for identifying the rechargeable batteries.

FIG. 2 shows a first type of contact pin, referred to as battery pin, namely the contact pins denoted by reference numerals 21 and 22 in FIG. 1. One of them is intended to identify the type of rechargeable battery placed in the cavity 3 by a conventional circuit (not shown) for identifying the electric resistance of the rechargeable battery 20, which circuit is situated on the printed circuit board (not shown). It is thus possible to recognize different types of rechargeable batteries, notably those equipped with an "NTC" component complying with the American standards. The other serves for connection between the charge pin of the rechargeable battery and the charge circuit situated on the printed circuit board, which in its turn is connected to the charger while this charger is branched. When they are mounted on the housing 2, these contact pins for the battery are electrically connected to the printed circuit board of the apparatus comprising a circuit for identifying the electric resistance.

FIG. 1 shows that these two contact pins 21 and 22 for the batteries are each placed between two contact pins 11 and 31 and 14 and 32, respectively. However, it will be noted that the position of their contact strip is less projecting than that the position of the two contacts between which they are placed.

FIG. 2 illustrates the shape of the contact pin 21 or 22 for the battery, particularly the shape of the contact strip 23 which is straight and slightly inclined with respect to a central part 24, and whose extremity is slightly curved back. These contact pins 21, 22 for the batteries are fixed by a lower lug 25 whose curved extremity allows it to be hooked on a wall of the set of notches, denoted by the reference numeral 4 in FIG. 1. The exact positioning of these two contact pins 21 and 22 for the batteries is realized by two lateral parts 26 mating with an embossed part 27 of the set of notches 4. These contact pins 21 and 22 for the batteries can thus be easily fixed and detached from their position.

Figure 3:
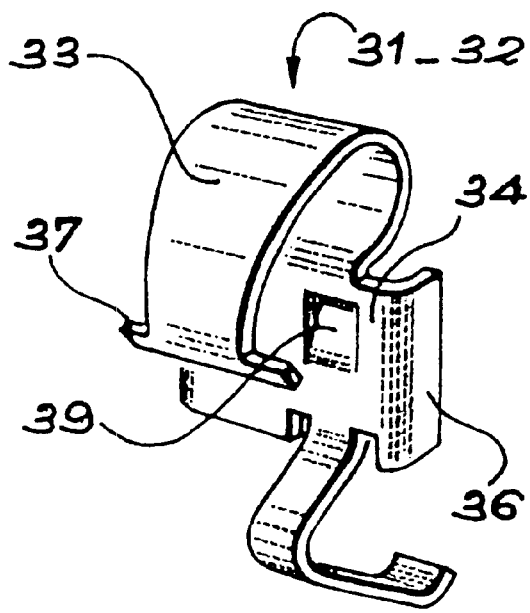
FIG. 3 shows the second type of contact pins, referred to as composite pins, used for the cells as well as for the rechargeable battery.

FIG. 3 shows a second type of contact pin, referred to as composite pins and denoted by the reference numerals 31 and 32 in FIG. 1. They are positioned on the housing 2, each at an extremity of one of the two contact series 6 and 7 in opposite directions and on the side of a battery contact pin 21 or 22.

FIG. 3 shows that their contact strip 33 has a bulging shape and terminates in a swan neck towards the part that connects it to a central part 34 of this composite contact pin. Note that this contact strip 33 has a width which gets increasingly thinner towards the extremity 37, but that the latter is wider. Such composite pins are positioned by two lateral curved parts 36 mating with an embossed part placed at an extremity of each set of notches 4 and being diametrically opposed. These two composite contact pins 31 and 32 are thus intended to establish the contact between the circuits of the mobile apparatus and also the primary cells as well as a rechargeable battery, but they also constitute the positive and negative poles of the device.

These two first types of contact pins are used for the electric power supply of the apparatus when a rechargeable battery is used.

The electric contacts for a set of primary cells, such as those used commercially, are the composite contact pins already described with reference to FIG. 3 and denoted by the reference numerals 31 and 32 in FIG. 1, but also the double contact pins for the cells, denoted by the reference numerals 11, 12 and 13, 14 in FIG. 1.

Figure 4:
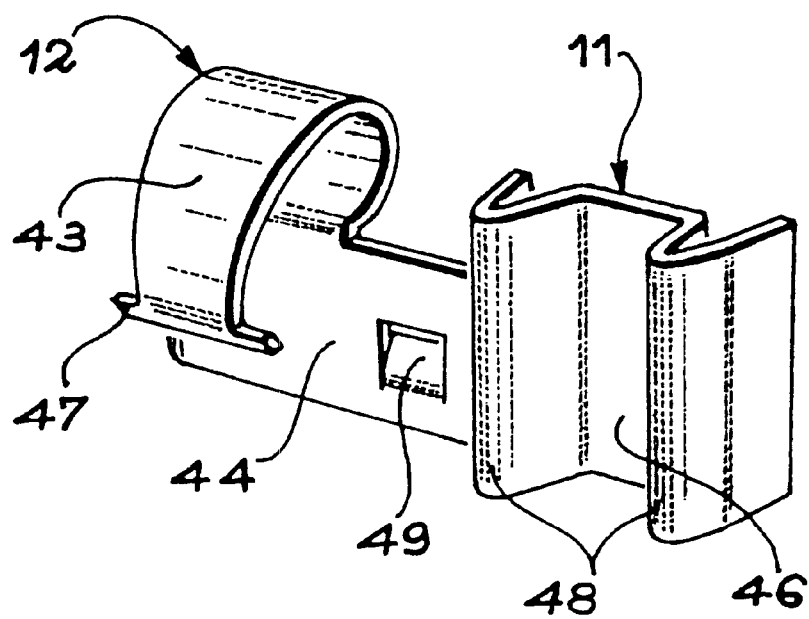
FIG. 4 shows the third type of contact pins referred to as double pins, used for the cells.
Figure 6:
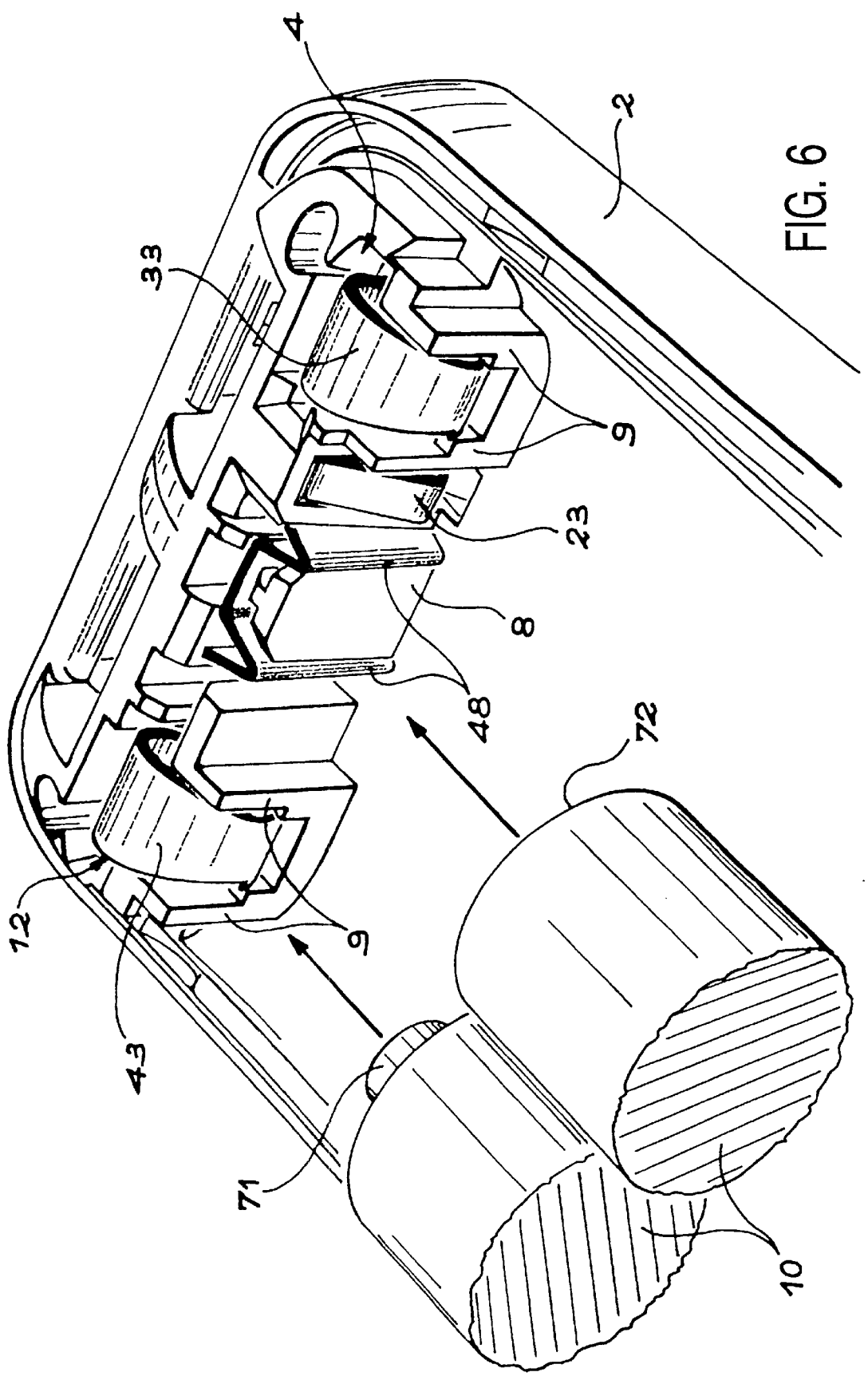
FIG. 6 shows the mounting of the cells with the power supply device according to the invention.

FIG. 4 shows a first of these two types of double contact pins. The first contact part 11 of these double contact pins is intended to be inserted in a slit of the set of notches 4 of the series of foot contacts 6 (FIG. 1). They mainly comprise a bottom 46 limited by two projecting flanges 48. As is shown in FIG. 6, the edges at the top of these two flanges 48 serve as a contact with the flat extremity 72 of a cell 10 which must be inserted between two other identical cells 10.

This first contact part 11 of the movable contact pin is attached to a central part 44 to which also a second contact part 12 is fixed. Its strip 43 is of the type described with reference to FIG. 3 and denoted by the reference numeral 33 and has a swan neck shape. Its functions are exactly the same as those of the strip 33 of the composite contact pin 31 or 32.

The extremities 37 and 47 of the strips 33 and 43 of the two types of contact pins described with reference to FIGS. 3 and 4 are widened so that they can be blocked by a fixed part. FIG. 6 shows that such an extremity 47 of a strip 43 rests in a small cavity of a set of notches 4 between the flanges 9.

The strips 33 and 43 of the contact pins 12 and 31 are thus retained in a prestressed state in a given position which is recessed with respect to the depth of the notch in which each strip is present so as to avoid contact with the flat extremity of a primary cell and thus contribute to error elimination. This prestressed state is necessary because without this state it is difficult to ensure that the strips 43 and 33 are recessed with respect to the flanges 9 because the thermal treatments of these strips (curing at 810° C. and tempering at 300° C.) deform them enormously.

The extremity 37 of the composite contact pin, denoted by reference numeral 32 in FIG. 1, is not blocked in the housing 2 and is thus not operational. Its existence allows obtaining uniqueness of the type of composite contact pin so as to lower the cost of production by using a single cutting and folding tool.

Figure 5:
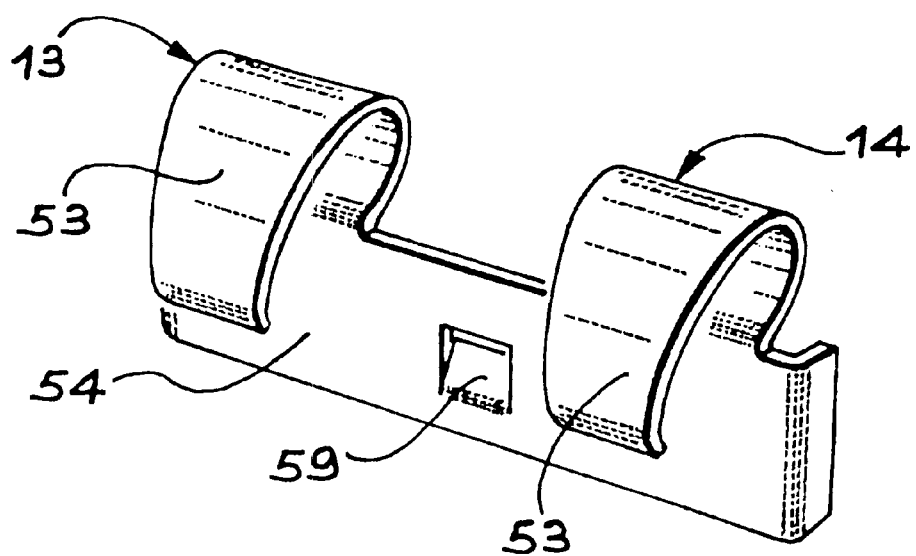
FIG. 5 shows the fourth type of contact pins, also referred to as double pins, used for the cells.

FIG. 5 shows the second type of double contact pin. This pin has a central part 54 to which two contact parts 13 and 14 are connected, whose strips 53 are identical to that of the composite contact pin 31 or 32 and to that of the second contact part 12 of the double contact pin, described with reference to FIG. 4. Their functions are also identical to these previously described strips 33 and 43.

It is clearly shown that the double contact pins in FIGS. 4 and 5 are not in contact with the printed circuit board and only serve for the primary cells. Indeed, they are used to make the connection between the primary cells placed on the sides of the housing and the primary cell placed in the middle, but also for eliminating mistakes when mounting these primary cells.

It will be noted that each contact pin in these four embodiments described in FIGS. 2 to 5 has a tongue 29, 39, 49, 59 obtained by partial indentation of the metal constituting these contact pins. The opening of the tongues 29, 39, 49, 59 is directed upwards so that each of them constitutes a system for blocking the contact pin in its position and it is difficult to relieve the latter from its placement without directly acting on each of these tongues 29, 39, 49 or 59.

FIG. 6 shows how these different contact pins are installed and fixed in the housing 2 and more exactly in a set of notches 4.

It should be noted that, before they are incorporated in this housing, the primary cells 10 are manufactured by different companies in different countries and that their length might therefore slightly vary. The strips and contact pins accommodating them must thus be made proof to a certain flexibility so as to tolerate a small difference of length while ensuring that the electric contact is established and the cells are maintained in position.

The contact pin 12 has its strip 43 in the shape of a swan neck placed between two flanges 9 of the set of notches 4 and does not go beyond the cavity defined by these two flanges 9. Moreover, the distance between these two flanges 9 of the set of notches 4 is larger than a contact pin 71 of the cell 10 but smaller than the diameter of the same cell 10. Moreover, it is possible for the user to place the cell in the direction reverse to that shown in FIG. 6, but the system of error elimination is the following. When this cell is placed in the reverse direction, there will be no contact between its flat extremity 72 and the strip 43 of the contact pin because it will first touch the flange 9. It is for this reason that the strip 43 of the contact pin in question is prestressed and is thus in a recessed position with respect to the flanges 9. This remark also applies to error elimination of the cell placed in the middle. The user may introduce the cell 10 by its round contact pin but there will be no contact between it and the contact pin 11 of FIG. 1, so the apparatus will not function and the user will verify the direction of insertion of the cells, which is also explained by a scheme which is directly drawn in the plastic material of the housing 2. This constitutes the first error-elimination means.

The cell 10 placed in the middle must be mounted in the reverse direction. The electric contact will thus be ensured by the edge of the flanges 48 of the double contact pin. An abutment 8 molded in the set of notches 4 constitutes second error-eliminating means and also prevents the user from introducing the cell 10 by its round contact pin but by its flat extremity without a pin 72. This constitutes the second error-eliminating means.

In FIG. 1 it can be seen that there are contact plates 60 on the rechargeable battery 20 similarly as the correspondingly positioned positioning slits 61, while the composite contact pins 31 and 32 are placed in a position corresponding to these slits when the rechargeable battery is put into place. It is impossible for the user to mount the battery in a position which does not correspond to that required by the operation of the apparatus. Moreover, the contact plates 60 allow electric contact to be established between the battery contact pins 21 and 22 but also with the composite contact pins 31 and 32, both positively and negatively.

The rechargeable battery has exact dimensions defined by the cavity 3 of the housing 2 and the position of the two sets of notches 4. It uses soldered contacts for interconnecting the different elements of the secondary cells constituting them. Moreover, for the purpose of protecting the rechargeable batteries, each of them has a thermoswitch likewise as the component having the negative temperature coefficient NTC. This avoids problems of overcharge during charging.

To avoid the destruction of the mobile apparatus, particularly a portable telephone, one also uses a diode placed between the positive composite contact pin 31 for the primary cells and the positive pole of the portable apparatus. It may be noted that the same positive composite contact pin 31 is used for the cells as well as for the rechargeable batteries. In correspondence thereto, the composite contact pin 32 arranged diametrically opposite the composite contact pin 31 is the only contact pin which is used for connection to ground.

Great elasticity may be obtained by subjecting the strips 23, 33, 43, 53 of the different contact pins to a thermal treatment such as a curing treatment at 810° C. and a tempering treatment at 300° C. for steel XC 75 with a copper or nickel cladding. A copper cladding provides a very good connection with the nickel and a nickel cladding provides a very good contact resistance between the metal and the primary cells and the rechargeable batteries whose extremities are also made of nickel.

The power supply device according to the invention avoids the use of a removable piece by allowing the use of rechargeable batteries as well as primary cells.

It complies with all the standards for primary cells of the "R6" type.

It prevents excessive charging of the rechargeable batteries.

It allows recognition of the type of rechargeable batteries used.

Finally, the error-eliminating means prevent the user from incorrectly mounting the primary cells.

What is claimed is:

1. A power supply device for a portable apparatus, said power supply device comprising:
    a housing (2) having a cavity (3) for accommodating at least one primary cell (10) or a secondary cell (20);
    a first series (6) of contact pins (11, 12, 21, 31) coupled to said housing (2) at said bottom end of said cavity (3);
    a second series (7) of contact pins (13, 14, 22, 32) coupled to said housing (2) at said top end of said cavity (3);
    wherein, when the at least one primary cell (10) is installed within the cavity (3) between said first series (6) of said contact pins (11, 12, 21, 31) and said second series (7) of said contact pins (13, 14, 22, 32), a first subset (21, 22, 31, 32) of said first series (6) of said contact pins (11, 12, 21, 31) and said second series (7) of said contact pins (13, 14, 22, 32) exclusively communicates with the at least one primary cell (10); and
    wherein, when the secondary cell (20) is installed within the cavity (3) between said first series (6) of said contact pins (11, 12, 21, 31) and said second series (7) of said contact pins (13, 14, 22, 32), a second subset (11, 12, 31, 13, 14, 32) of said first series (6) of said contact pins (11, 12, 21, 31) and said second series (7) of said contact pins (13, 14, 22, 32) exclusively communicates with the second cell (20).

2. The power supply device of claim 1,
    wherein said first series (6) of contact pins (11, 12, 21, 31) includes a first composite pin (31);
    wherein said second series (7) of contact pins (13, 14, 22, 31) includes a second composite pin (32); and
    wherein said first composite pin (31) and second composite pin (32) are contact pins within both said first subset of said first series (6) of said contact pins (11, 12, 21, 31) and said second series (7) of said contact pins (13, 14, 22, 32), and said second subset of said first series (6) of said contact pins (11, 12, 21, 31) and said second series (7) of said contact pins (13, 14, 22, 32).

3. The power supply device of claim 1, wherein said first series (6) of contact pins (11, 12, 21, 31) includes a first battery pin (21);

wherein said second series (7) of contact pins (13, 14, 22, 31) includes a second battery pin (22); and wherein said first battery pin (21) and second battery pin (22) are contact pins exclusively within said second subset of said first series (6) of said contact pins (11, 12, 21, 31) and said second series (7) of said contact pins (13, 14, 22, 32).

4. The power supply device of claim 1, wherein said first series (6) of contact pins (11, 12, 21, 31) includes a first double pin (11, 12);

wherein said second series (7) of contact pins (13, 14, 22, 31) includes a second double pin (13, 14); and wherein said first double pin (11, 12) and second double pin (13, 14) are contact pins exclusively within said first subset of said first series (6) of said contact pins (11, 12, 21, 31) and said second series (7) of said contact pins (13, 14, 22, 32).

5. The power supply device of claim 1, further comprising:

an error-elimination means for ensuring a proper installation of the at least one primary cell (10).

* * * * *